United States Patent
Scrimo, Jr.

(10) Patent No.: US 9,672,080 B2
(45) Date of Patent: Jun. 6, 2017

(54) SYSTEMS AND METHODS FOR ENABLING DYNAMIC CALLS VIA FILTERING, GROUPING, AND SUBSTITUTION MECHANISMS

(71) Applicant: Oracle International Corporation, Redwood City, CA (US)

(72) Inventor: Robert Thomas Scrimo, Jr., Thornton, CO (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 210 days.

(21) Appl. No.: 14/165,053

(22) Filed: Jan. 27, 2014

(65) Prior Publication Data
US 2015/0212864 A1   Jul. 30, 2015

(51) Int. Cl.
G06F 3/00 (2006.01)
G06F 9/44 (2006.01)
G06F 9/46 (2006.01)
G06F 13/00 (2006.01)
G06F 9/54 (2006.01)

(52) U.S. Cl.
CPC .................................. *G06F 9/541* (2013.01)

(58) Field of Classification Search
None
See application file for complete search history.

(56) References Cited

U.S. PATENT DOCUMENTS

| | | | |
|---|---|---|---|
| 5,852,818 A * | 12/1998 | Guay et al. | |
| 2009/0178056 A1 * | 7/2009 | Koeth et al. | 719/311 |
| 2009/0219820 A1 * | 9/2009 | Acke et al. | 370/241 |
| 2014/0055880 A1 * | 2/2014 | Jhatakia et al. | 360/31 |

* cited by examiner

*Primary Examiner* — Craig Dorais
(74) *Attorney, Agent, or Firm* — Kilpatrick Townsend & Stockton LLP (57) ABSTRACT

Aspects of the present disclosure involve systems and methods that enable the dynamic execution of code library calls using external system data. A processing device processes unstructured data to generate structured data that optionally may be filtered. The processing device uses the structured data and one or more parameter groupings to execute various commands associated with a code library of an external system.

17 Claims, 8 Drawing Sheets

602 → GROUP 1: parameter 605, parameter 607, parameter 608 ...

604 → GROUP 2: [parameter 610, parameter 612]

606 → GROUP 3: parameter 614, parameter 616, "Group 2", parameter 618

FIG. 6A

622 → SPECIFICATION 1: parameter 610, parameter 612, parameter 614, parameter 616, parameter 618

624 → SPECIFICATION 2: parameter 618, parameter 616, parameter 610, parameter 612, parameter 614

SYSTEMS AND METHODS FOR ENABLING DYNAMIC CALLS VIA FILTERING, GROUPING, AND SUBSTITUTION MECHANISMS

TECHNICAL FIELD

Aspects of the present disclosure relate to code libraries, and in particular, to the automatic invocation and execution of programmatic command calls of a code library of an external system or apparatus.

BACKGROUND

Computer applications are rarely implemented as a single module of code because much of the functionality may exist within an existing code library. In fact, many programming languages, such as Java®, C, and C++, provide standardized code libraries that contain pre-written functionality that developers can access when coding new applications. Rather than re-writing functionality, developers simply access the existing code via code library calls, as required. For example, operating systems often provide standard code libraries that include functionality, such as writing standard output or drawing complex images using a graphics card. Instead of writing code for the output and drawing functions, programmers can simply inherit the functionality from the operating system's code library by making one or more calls to the code library.

Similar to many programming languages, many automated devices use code library's that may be accessed by developers to physically control the functionality of such devices. For example, code libraries are often used to physically control complex enterprise computing devices, such as enterprise storage devices, mainframes, and/or the like. Conventional methods for making calls to the code library typically include the use of hard-coded and static programmatic calls defined in a single programming language. Highly-skilled programmers are often needed, and the projects are often time-consuming, labor intensive, and expensive.

It is with these problems in mind, among others, that various aspects of the present disclosure were conceived.

SUMMARY

Aspects of the present disclosure involve methods for making generic library calls. The method, executable by a processor, includes receiving unstructured data from an external system, the external system including a code library comprising one or more commands. The method further includes generating structured data by defining a structure for the unstructured data. The method includes generating at least one grouping of one or more parameters included in a definition of at least one command of the one or more commands, the grouping defining how to substitute the one or more parameters with data included in the structured data. The method further includes substituting the one or more parameters of the at least one command with the data according to the grouping. The method includes executing the at least one command at the external system when the substitution of the one or more parameters is complete.

Aspects of the present disclosure involve systems for making generic library calls. The system includes at least one external system comprising a code library, the code library including one or more commands capable of being called at the external system. The system further includes at least one processor communicatively connected to the external system. The at least one processor is configured to generate structured data by defining a structure for the unstructured data. The at least one processor is further configured to reduce the structured data according to at least one filtering constraint. The at least one processor is configured to generate at least one grouping of one or more parameters included in a definition of at least one command of the one or more commands, the grouping defining how to substitute the one or more parameters with data included in the structured data. The at least one processor is configured to substitute the one or more parameters of the at least one command with the data according to the grouping. The at least one processor is further configured to execute the at least one command at the external system when the substitution of the one or more parameters is complete.

Aspects of the present disclosure include non-transitory computer readable mediums including instructions for making generic library calls. The instructions, executable by a processor, include receiving unstructured data from an external system, the external system including a code library comprising one or more commands capable of being called. The instructions further include generating structured data by defining a structure for the unstructured data. The instructions include generating at least one grouping of one or more parameters included in a definition of at least one command of the one or more commands, the grouping defining how to substitute the one or more parameters with data included in the structured data. The instructions include substituting the one or more parameters of the at least one command with the data according to the grouping. The instructions further include executing the at least one command at the external system when the substitution of the one or more parameters is complete.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve systems and methods for dynamically executing code library calls of an external system, such as external enterprise-level computing devices, systems and/or apparatuses, storage devices, tape libraries, mainframes, engineering workstations, and the like. The command calls are executed using data obtained from previous command calls made to the external system. In various aspects, a processing device, such as a server, executes one or more command calls at the code library of the external system. A code library generally represents a collection of functions or implementations of behavior, written in terms of a specific programming language that includes a well-defined interface by which the behavior or functions are invoked. A software program typically invokes the behaviors of a code library using a mechanism of the language in which the program is designed or implemented. Stated differently, code library command calls, generally referred to as "library calls," are implemented and invoked (i.e. programmed) within the program code. For example, in a programming language such as Java®, the behavior in a code library is invoked using standard Java® function calls. Code libraries are often provided as a mechanism to control the physical functions of an external system and/or external mechanical device or apparatus. For example, code libraries are commonly provided for external enterprise-level computing devices, systems, and/or apparatuses, such as storage devices, tape libraries, mainframes, engineering workstations, and the like.

In response to executing code library calls of such external systems, the system receives as output from the external system, unstructured and/or "raw" data. The data is considered unstructured because it includes irregularities and ambiguities that make it difficult to parse and/or otherwise process. A structure is thereafter generated for the unstructured data. Additionally, the system generates groups of parameters ("parameter groupings") of one or more parameters. The grouped parameters correspond to parameters required by one or more of the command calls capable of being made at the code library of the external system. Using the parameter grouping as a mapping, the parameters of the command calls are substituted with structured data at run-time, thereby dynamically and automatically modifying or otherwise changing the processing of external system code library call(s). The command calls are dynamic because any modifications made to the parameter groupings will be reflected in the command calls, at run-time.

Figure 1:
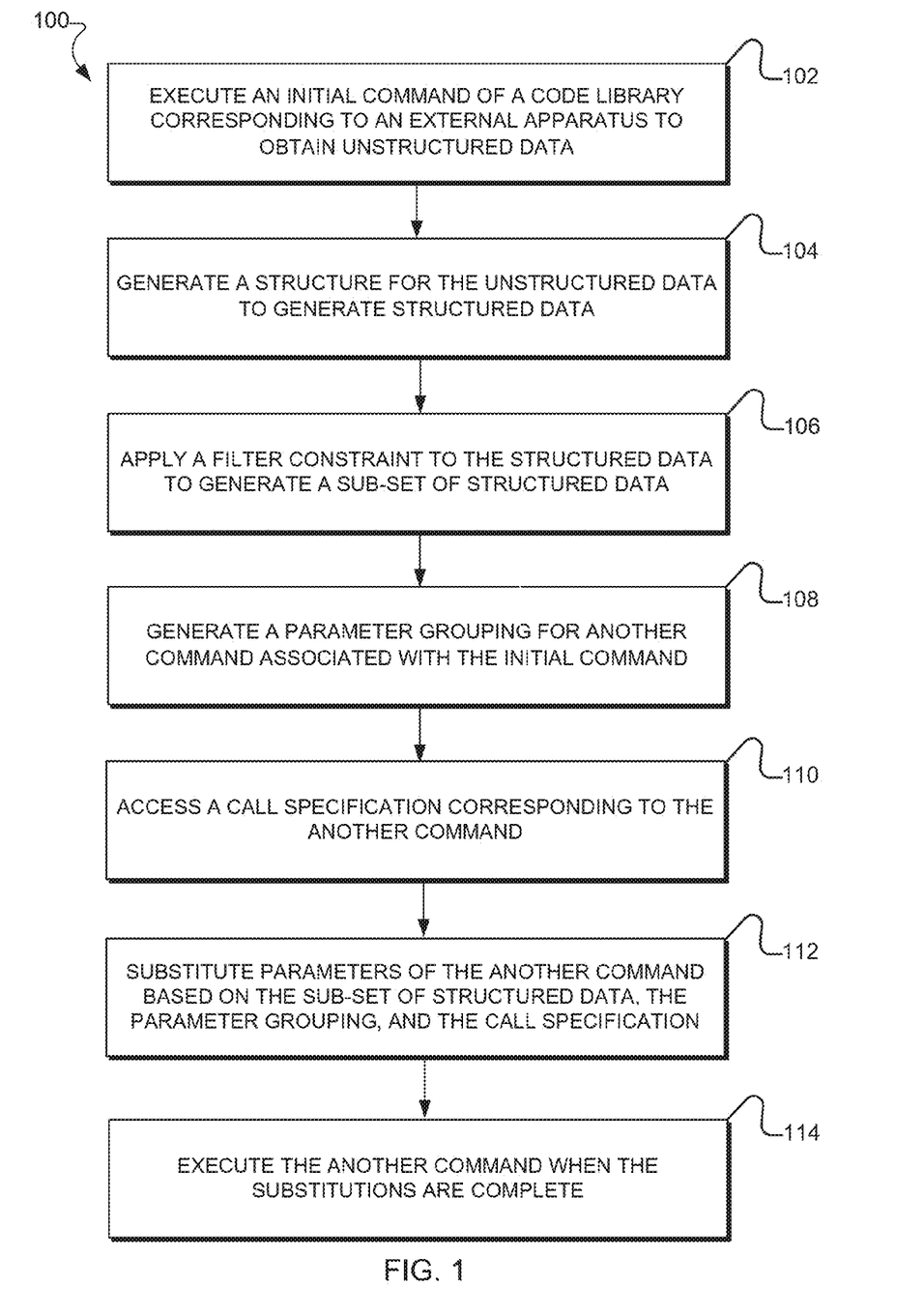
FIG. 1 is a flowchart illustrating an example process for enabling execution of code library calls using external system data, according to aspects of the present disclosure.
Figure 2:
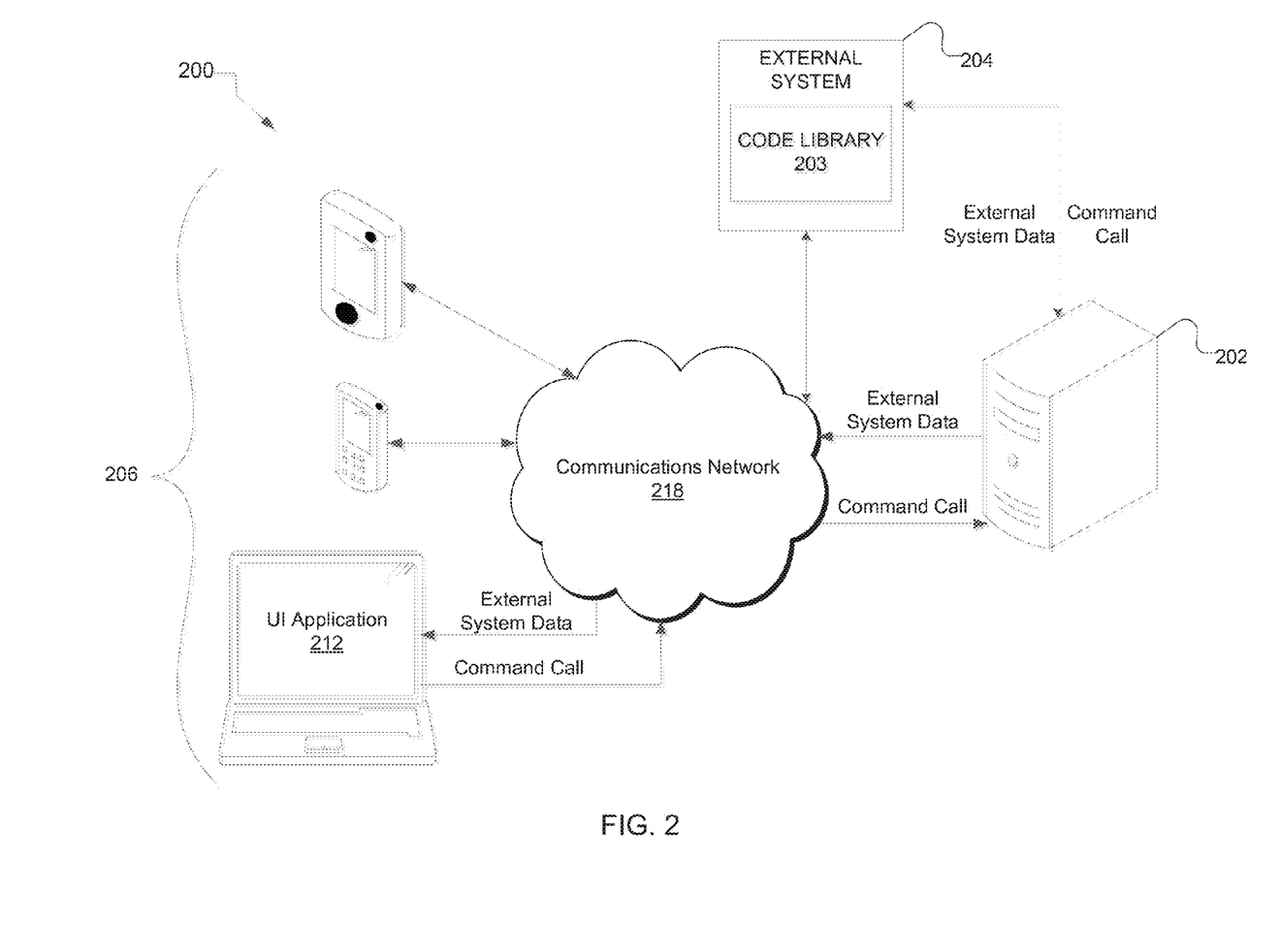
FIG. 2 is block diagram illustrating a computing environment for enabling execution of code library calls using external system data, according to aspects of the present disclosure.

An illustrative process and system for enabling and automatically executing code library calls for an external system using external system data, is depicted in FIGS. 1-2. In particular, FIG. 1 illustrates an example process 100 for automatically executing code library calls using external system data. FIG. 2 illustrates a processing device, depicted as a server 202, operating in conjunction with various other hardware and/or software components that may be used to perform or otherwise execute the process 100.

Referring now to FIG. 1, process 100 begins with executing one or more initial command calls of a code library corresponding to an external system to obtain unstructured data (operation 102). As illustrated in FIG. 2, initially, a server 202 may transmit instructions that may be processed and/or executed to generate, or otherwise display, one or more interfaces (e.g. a graphical user-interface), including interactive elements, such as buttons, forms, fields, selections, inputs, streams, etc., for enabling a user to invoke one or more command calls of a code library 203 of an external system 204. The server 202 may be a personal computer, work station, server, mobile device, mobile phone, processor, and/or other type of processing device and may include one or more processors that process software or other machine-readable instructions. The server 202 may further include a memory to store the software or other machine-readable instructions and data and a communication system to communicate via a wireline and/or wireless communications, such as through the Internet, an Intranet, and Ethernet network, a wireline network, a wireless network, and/or another communication network.

The various interfaces may be displayed or otherwise provided to a client device(s) 206 that includes a user interface ("UI") 212, such as a browser application. A user may access the UI 212 to provide input defining or otherwise invoking a command call of the code library 203 of the external system 204. The client device(s) 206 may be a personal computer, work station, server, mobile device, mobile phone, tablet device, of any suitable type.

Figure 3A:
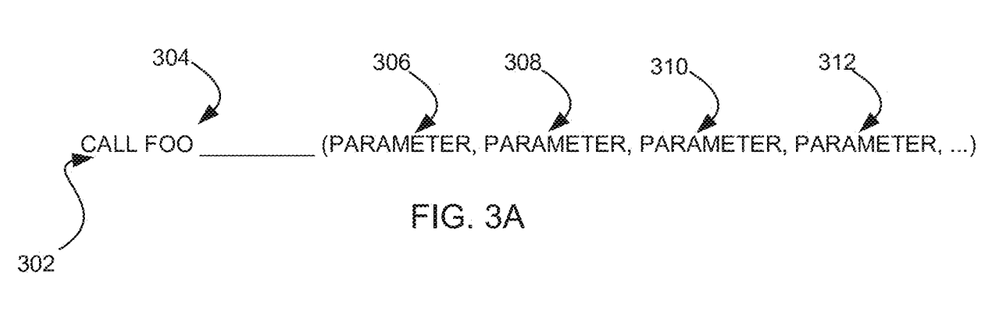
FIGS. 3A-3B are example illustrations of a command calls, according to aspects of the present disclosure.

FIG. 3A illustrates an example command call that may be defined at the client device 206 and executed by the server 202 to invoke a functionality of the code library 203 of the external system 204. As illustrated, the command call 302 includes an invocation (a call) of a function/procedure 304 (Foo) contained in the code library of the external system 204. The command call 302 may be invoked according to various programming languages, and in one particular embodiment, may be invoked in accordance with the Java® programming language. The command call 302 further includes one or more parameters 306-312 that represent special variables referencing specific pieces of data that are provided to execute the command call 302. While the command call 302 is depicted as having four parameters, it is contemplated that the command call 302 could have more or less parameters, or alternatively no parameters, enabling the command call 302 to be executed without passing any parameter data.

Referring again to FIG. 2, the client device 206 may transmit the commands (e.g. command 302) to the server 202, which may execute (a call) the command at the code library 203 of the external system 204. As described above, a code library represents a collection of functions or implementations of behavior, written in terms of a specific programming language, that has a well-defined interface by which the behavior or functions are invoked. Thus, the code library 203, according to one embodiment, represents a collection of functions that may be executed and/or invoked at the external system 204. The external system 204, may be any type of external enterprise-level computing device, system, and/or apparatus, such as storage devices, tape libraries, mainframes, engineering workstations, etc.

In response to executing a command call at the code library 203 of the external system 204, the server 202 may receive unstructured data including information about the external system and its functions, actions, capabilities, and the like. The unstructured data received as output from the external system 204 is considered unstructured because it is provided without a pre-defined data structure, or otherwise includes a structure that the system cannot readily use and/or process. While the unstructured data may include specific data maintained within or otherwise related to the external system 204, the lack of a standard data structure and various other irregularities within the unstructured data make it difficult for other processing devices and/or applications (e.g. the server 202) to interpret, process, and manipulate.

Figure 4:
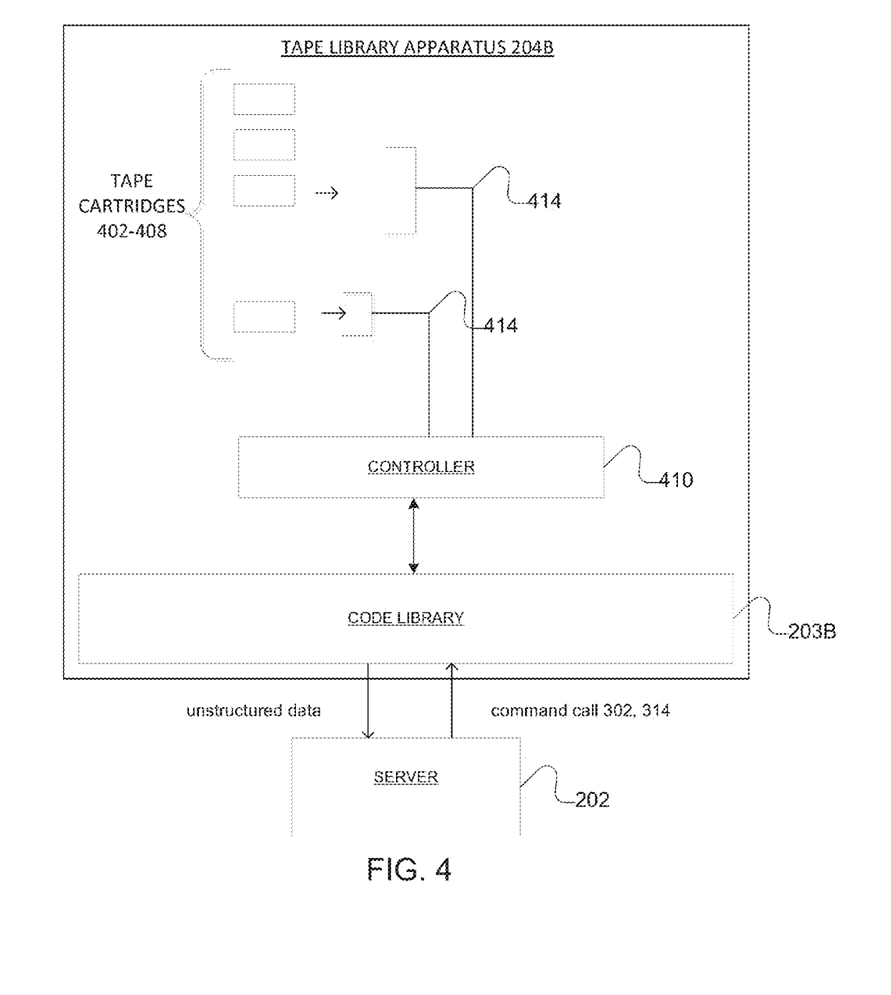
FIG. 4 is illustrates an example external system and/or apparatus, according to aspects of the present disclosure.

FIG. 4 provides an illustration of an example external system (e.g. external system 204) capable of providing unstructured data. In the illustrated embodiment, the external system 204 of FIG. 2 is depicted as a tape library apparatus 204B containing one or more tape cartridges 402-408 capable of accessing and/or storing data. The tape library apparatus 204B further includes a controller 410 capable of executing the various functionality contained within the code library 203B to manipulate mechanical component(s) 414 (e.g. a robotic arm), which are configured to perform various operations on the tape cartridges 402-408. For example, the controller 410 may initiate a command call to mount and/or unmount a specific tape cartridge using the various mechanical components 414 and subsequently access data stored within the accessed tape cartridge. While the code library 203B is of FIG. 4 is illustrated as being located within the tape library 204B, it could be located elsewhere and external to the tape library 204B.

Figure 3B:
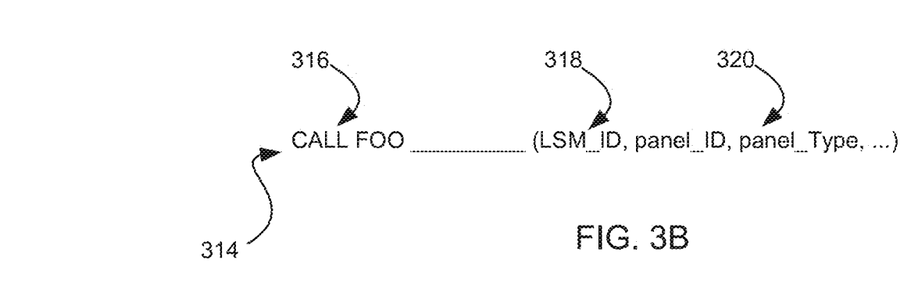

FIG. 3B illustrates an example command call 314 that may be executed at the tape library apparatus 204B to obtain unstructured data. Similar to the command call of FIG. 3A, the command call 314 includes an invocation (i.e. a call) of a function/procedure 316 contained in the code library of the tape library apparatus 204B. The command call 314 also includes one parameter 318, a LSM_ID parameter 318 that uniquely identifies a library storage module within tape library apparatus 204B. Stated differently, the LSM_ID parameter provides a unique identifier of a given library storage module included within the tape library apparatus 204B. Each library storage module is a container for one or more panels, where each panel contains one or more cells. Each cell may be empty, or may contain a tape cartridge, or a tape drive containing a tape cartridge. The PANEL_TYPE is the type of panel for the PANEL_ID, all of which is part of the communication protocol design specific to each library. Thus, as illustrated in FIG. 3B, the LSM_ID, PANEL_ID, and PANEL_TYPE are parameters requiring the minimum information and/or data needed to retrieve cell information for a specific panel located within the tape library apparatus 204B.

The command call 314 may be transmitted from the server 202 and called at the code library 203 of the tape library 204B, which activates by, for example transmitting a protocol command call containing command data, to the controller 410 to initiate various operations at the controller 410. In response, unstructured data may be provided back to the server 202. For example, the unstructured data may include formatted strings (e.g. fixed field, free-form text, extensible markup language, JavaScript Object Notation, etc.), binary data, native data types (e.g. lists, dictionaries, integers, floats, booleans, strings, or any combination), any of which may include one or more data fields. The unstructured information may describe or otherwise include information about the various library storage modules and panels within the tape library apparatus 204B.

Referring again to FIG. 1, having received unstructured data, a structure for the unstructured data may be generated (operation 104). Specifically, the server 202 may provide a process or mechanism for generating one or more mapping entries for the unstructured data. Stated differently, portions of data (e.g. data variables) included within the unstructured data are associated with parameters of the various command calls capable of being called at the code library 203 of the external system 204. In one particular embodiment, an automatic transformation process may be executed by the server 202 that transforms the unstructured data into structured data by extracting the data fields of the unstructured data and assigning the extracted data fields of the unstructured data to specific parameters included in the structured data. For example, assume an unstructured data set included the following string: "AABBCCCCDDEEFGHHHHHH-DDEEFGHHHHHHDDEEFGHHHHHHDDEEFGHHHHH-HDDEE FGHHHHHH". The server 202 may execute a process that generates the following mapping between the data fields (i.e., the string tokens of the unstructured data set) of the unstructured data and parameters of the structured data corresponding to a tape library catalog. Specifically, AA of the unstructured data could be mapped to an LSM_ID parameter of the structured data, BB of the unstructured data could be mapped or otherwise assigned to the PANEL_ID parameter of the structured data, and so on. It is contemplated that any data field of the unstructured data may be assigned to any parameter of the structured data. While the provided example involves string substitutions, it is contemplated that other data types may be used and/or implemented.

Figure 5:
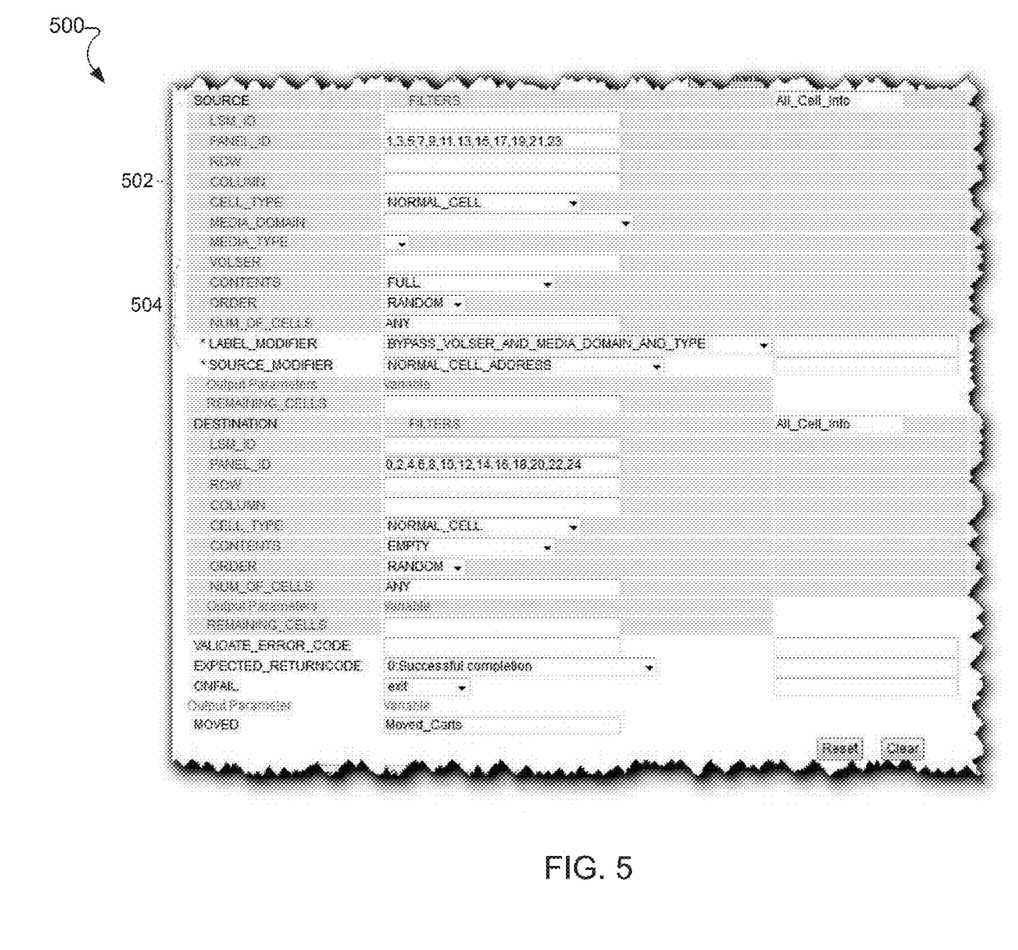
FIG. 5 is an illustration of a filtering interface, according to aspects of the present disclosure.

The structured data may optionally be filtered to remove unwanted information, resulting in a sub-set of structured data (operation 106). Referring to FIG. 2, the server 202 may generate one or more filtering interfaces including interactive elements, such as buttons, forms, fields, selections, inputs, streams, etc., any of which enable a user (e.g. via the client device 206) to apply a filtering constraint to structured data. Applying filter constraints reduces the structured data to a smaller subset of structured data that only includes the portions of data satisfying the specified filter constraints. Thus, when the user selects a filter constraint, the server 202 initiates a filtering process that filters the structured data into a subset of structured data by removing the portions of data originally contained within structured data that does not satisfy the selected filter constraint(s). FIG. 5 is an example illustration of a filtering interface 500. In the depicted embodiment, the filtering constraint 502, when applied, will limit the structured data used during system processing. More particularly, the filtering process applies "value" filtering of the various parameters included in the "structured data". Stated differently, the filtering is performed by restricting the parameters in the structured data based on the value associated with the parameter. The illustrated example depicts filter for a Tape Library "move" operation. Assume the "move" operation has filters for picking the source cartridges in any of the odd panels and filters for picking empty cells in any of the even panels. This specific implementation has two types of filters: "direct" and "special methodology." LSM_ID, PANEL_ID, ROW, COLUMN, CELL_TYPE, MEDIA_DOMAIN, MEDIA_TYPE, VOLSER 502 are filters that relate "directly" to parameters in the "structured data." CONTENTS, ORDER and NUM_OF_CELLS 504 illustrate "special methodology" filters that provide additional context to simple filtering. Additional context filtering means that it is possible that one or more parameter(s) in the "structured data" may be used together to give context to a specific filtering concept. For example, a filter such as CONTENTS="FULL" may mean that the actual filter is a compound filter that equates to {CELL_STATUS is "FULL" and VOLSER is not empty. Alternatively, CONTENTS=EMPTY may mean that the actual filter is a compound filter that equated to {CELL_STATUS is "EMPTY" and VOLSER is "null"}. ORDER and NUM- BER_OF_CELLS are implementation specific concepts that tell the system to operate on the structured data using generic concepts. ORDER tells the system how to choose "structured data" objects after the "direct" and "CONTENTS" filters are applied. Examples of this type of filtering may include "Random", "First-to-Last", "Last-to-First", etc. The NUM_OF_CELLS can potentially limit how many "structured data" "objects" to choose at a maximum, or alternatively, the NUM_OF_CELLS is equal to the value "ANY", as many "objects" as possible are chosen. "Output Parameter(s)" can be the resulting "structured data" that is generated via the code library calls after the resulting "raw data" is transformed into "structured data." Any of such filtered structured data may be used as input into this system to perform other code library call(s).

Figure 6A:
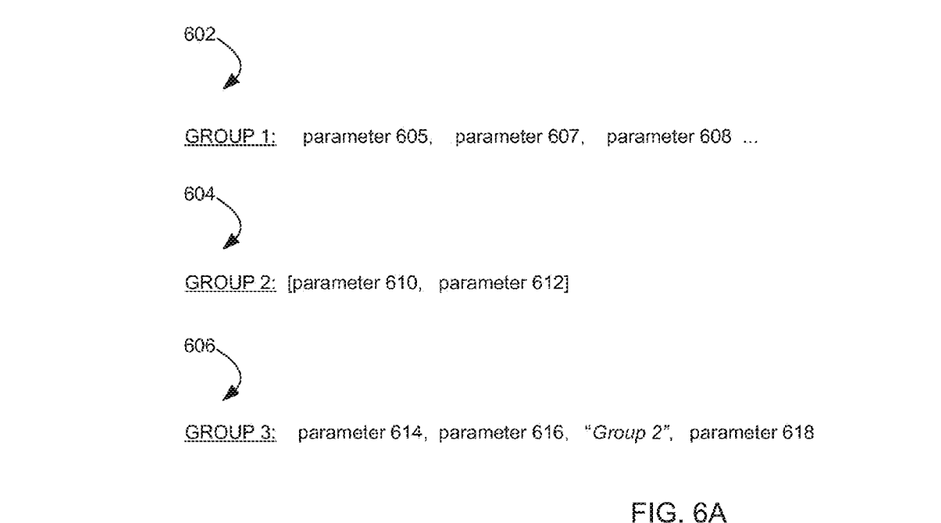
FIGS. 6A-6B is are illustrations of parameter groupings and call specifications, according to aspects of the present disclosure.

Referring again to FIG. 1, in addition to optionally filtering the structured data, the server 202 may generate a one or more parameter groupings (operation 108). A parameter grouping defines the group-ordering in which the parameters of a command call capable of being called at the code library 203 of the external system 204 are substituted with data included within the structured data. FIG. 6A illustrates example parameter groupings 602-606 for a command, such as the commands illustrated in FIGS. 3A-3B. As illustrated, each grouping may have one or more listed parameters in groupings that describe the order in which a specific parameter will be substituted (as will be described below) within the call of a given command call made to the code library 203 of the external system 204. The list of parameters included within a parameter grouping is evaluated left to right.

In the illustrated embodiment, the parameter grouping 602 includes three parameters 605, 607, and 608. Thus, if the parameter grouping 602 is used during substitution, then three parameters will be substituted within the call of a given command made to the code library 203 of the external system 204 and the parameters will be substituted in the order listed within the parameter group. Accordingly, parameter 605 is substituted first in its own individual group or sub-set. Next, parameter 607 is substituted in its own individual group or sub-set. Finally, parameter 608 is substituted in its own individual group or sub-set.

The parameter grouping 604 includes two parameters 610 and 612. Thus, if the parameter grouping 604 is used during substitution, then only two parameters will be substituted within the call of a given command call made to the code library 203 of the external system 204 and the parameters will be substituted in the groupings listed within the parameter group 604. In the parameter group 604, the parameters 610 and 612 are bracketed, indicating that the parameters are in the same group and therefore should be substituted at the same recursion level (i.e., the same time). Thus, parameter 610 and parameter 612 are substituted together.

The parameter grouping 606 (i.e. Group 3) includes parameters 614, 616 and 618 and a reference to "Group 2" 604. Thus, if the parameter grouping 604 is used during substitution, then five parameters will be substituted within the call of a given command call made to the code library 203 of the external system 204. Parameter 614 is substituted first. Parameter 616 is substituted second. The reference to "Group 2" indicates that the parameters within group 2 should also be substituted within the call of the command call made to the code library 203 of the external system 204. Thus, in this case, parameters 610 and 612 are substituted together, and further are substituted third to parameter 616. Finally, parameter 618 will be substituted in sequential order, after parameters 610 and 612.

Figure 6B:
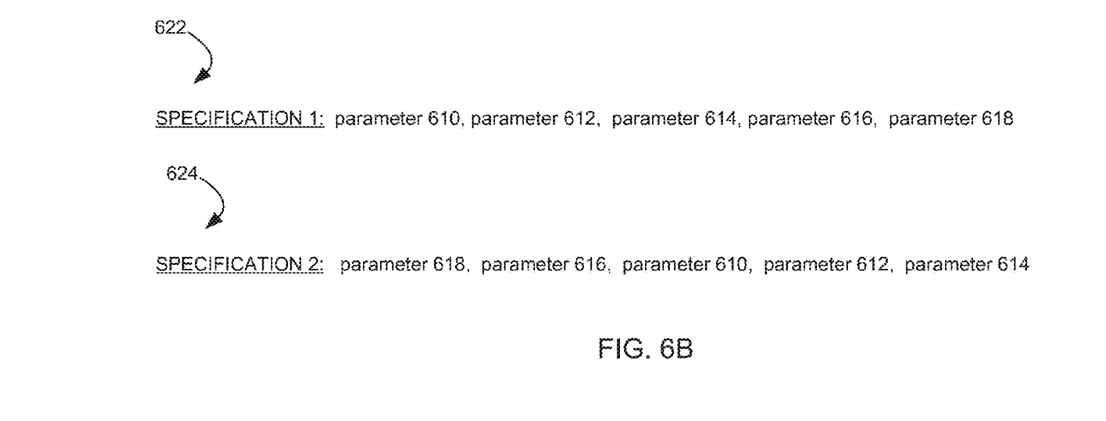

Referring again to FIG. 1, in addition to generating a parameter grouping, the server 202 may generate or otherwise access a command call specification (operation 110). The command call specification describes where the selected object's structured data parameters will be substituted into a command call as a basic string replacement. Parameter names included in the command call specification match the parameters included within the structured data. FIG. 6B illustrates example command call specifications 622-624 for a command call, such as the commands illustrated in FIGS. 3A-3B. As illustrated, each call specification may list one or more parameters, effectively defining which parameters may be substituted (as will be described below) within the call of a given command call made to the code library 203 of the external system 204. Thus, in the illustrated embodiment of FIG. 6B, if a command call including five parameters 610-618 were to be substituted according to specification 1 622, any one of the parameters 610-618 may be substituted at the location listed within the call specification. Alternatively, if a command call including five parameters 610-618 were to be substituted according to specification 2 624, any one of the parameters 610-618 may be substituted at the location listed within the call specification. While the previous examples have been described with parameter groupings and/or call specifications including parameters, it is contemplated that either may have no parameters.

Figure 7:
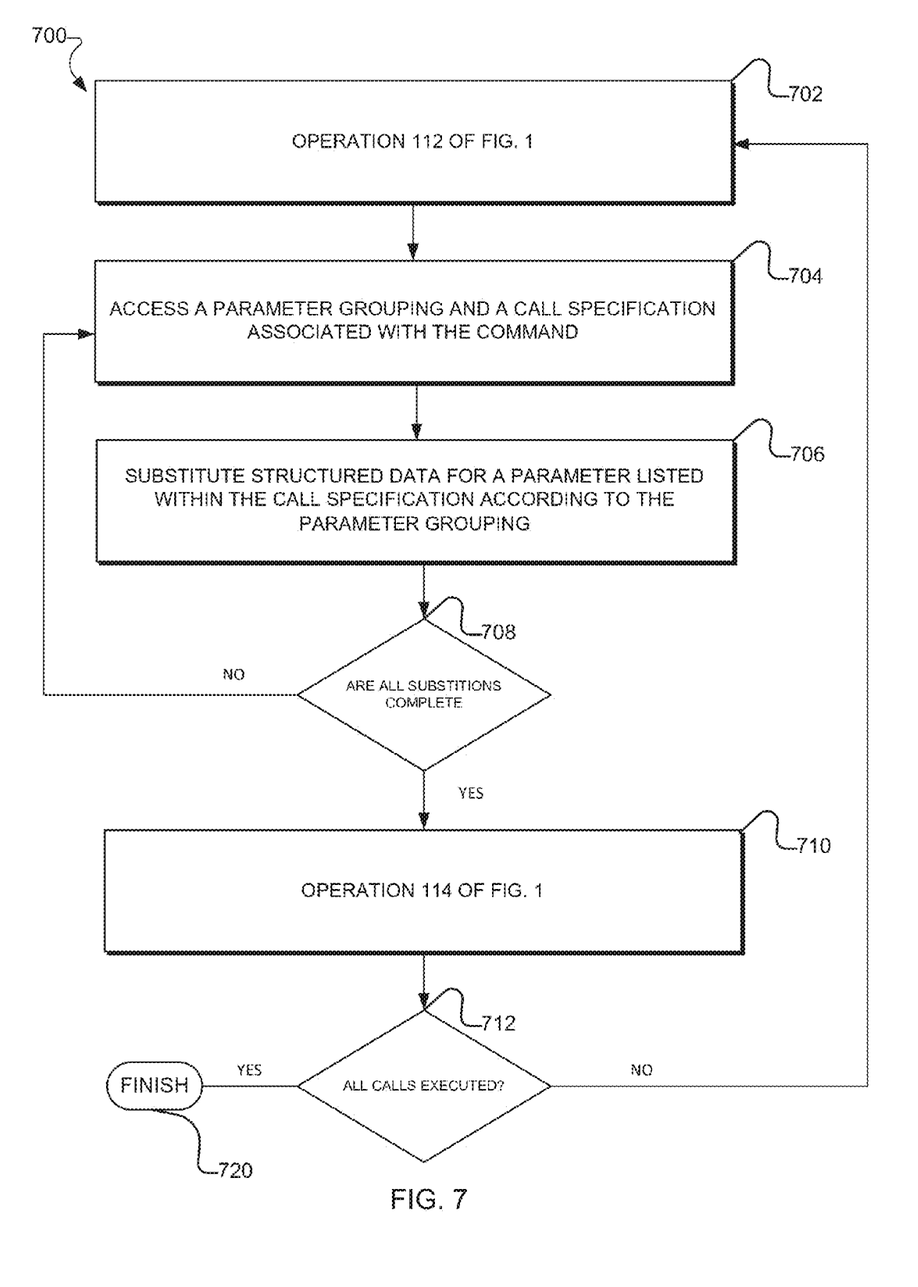
FIG. 7 is a flowchart illustrating an example substitution process performed during execution of code library calls using external system data, according to aspects of the present disclosure.
Figure 8:
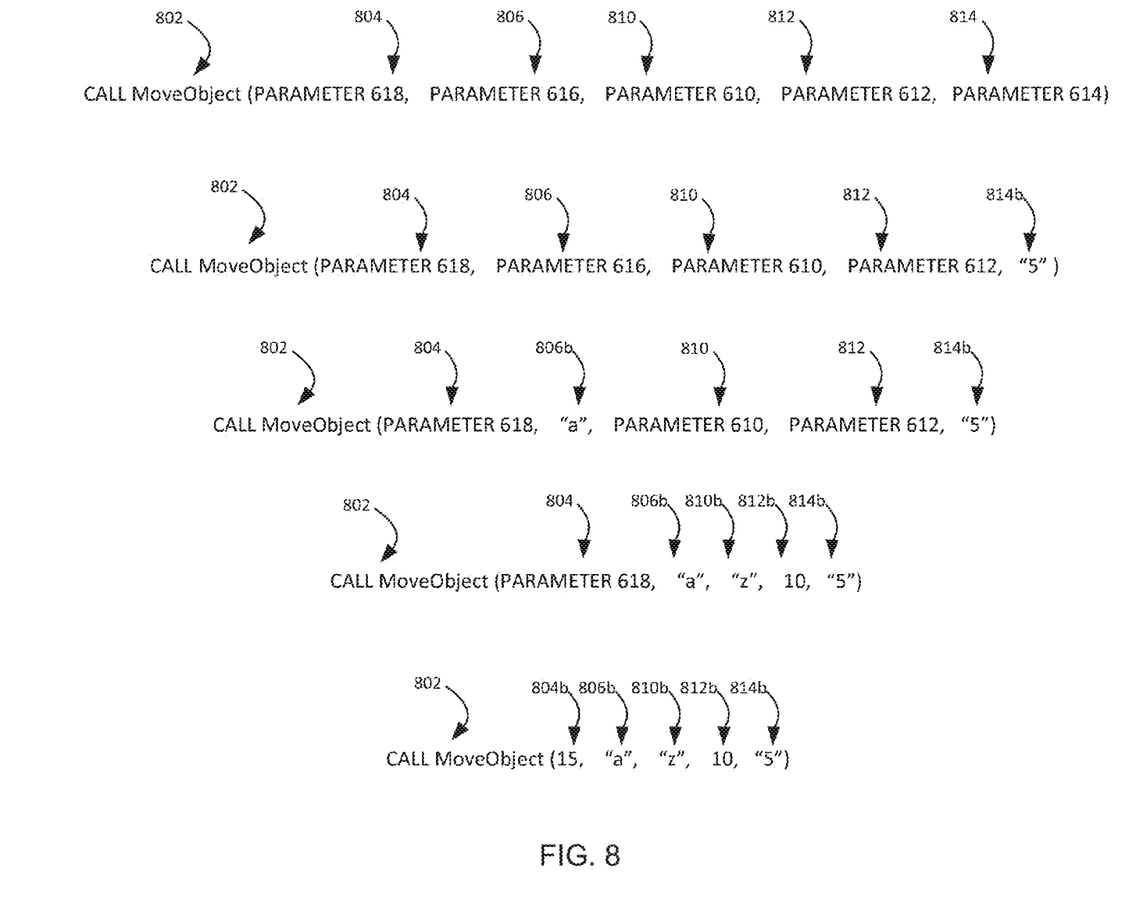
FIG. 8 is illustrates an example command library call, according to aspects of the present disclosure.

Referring again to FIG. 1, any generated parameter groupings, call specifications, and structured data may be used to substitute parameters of the various command calls capable of being called at the code library 203 of the external system 204 (operation 112). The parameters are recursively substituted, according to the listing within the call specifications and the parameter groupings, with data included in the structured data. FIG. 7 provides an example process 700 for recursively substituting parameters of a command call using parameter groupings. FIG. 8 provides an exemplary "MoveObject" command 800 being substituted with structured data according to the substitution process of FIG. 7 and according to the parameter groupings and call specifications depicted in FIG. 6A-6B.

Referring generally to FIGS. 6-8 and in particular to process 700 of FIG. 7, to begin, substitution is initiated on a command including one or more parameters, according to a parameter grouping and a call specification (operation 702). Operation 702 of FIG. 7 is the same substitution process initiated at operation 112 of FIG. 1. In the example embodiment of FIG. 8, substitution is initiated for a "MoveObject" command 802 including five parameters: 804-814 (each parameter is illustrated with parameter numbers corresponding to FIG. 6). Referring back to FIG. 7, after the substitution process is initiated, the sequential list of parameters included in a parameter grouping and/or a command call specification associated with the corresponding to the command is accessed (operation 704). As illustrated in FIG. 8, the "MoveObject" command 802 of FIG. 8 is being substituted according to parameter grouping 606 depicted in FIG. 6A and the call specification 2 624 of FIG. 6B.

Accordingly, structured data is substituted in the command call for each parameter included within the parameter grouping and according to the accessed call specification (operation 706). More specifically, the parameter grouping is accessed to identify the sequential order in which parameters should be substituted. Additionally, the command call specification is used is accessed to identify where the parameters will be substituted. Thus, referring to the "MoveObject" command 802 of FIG. 8, structured data is substituted (i.e.

at 814*b*) first for a parameter 814 (i.e. parameter 614) because parameter 614 is the first parameter listed in the parameter grouping 606, is grouped within the parameter group 606 as an individual, distinct, group and corresponds to the last parameter location in the call specification 2 624.

Referring back to FIG. 7, a determination is made whether all of the substitutions are complete (operation 708). In the illustrated embodiment of FIG. 8, multiple parameters (i.e. parameters 618, 616, 610 and 612) must still be substituted with structured data. Since all substitutions have not been completed, the process continues with the next substitution of the next parameter 806 (i.e. parameter 616) of the "MoveObject" command 802. Specifically, structured data is substituted in parameter 806 (i.e at 806*b*) because parameter 616 is the second parameter listed the parameter grouping 606, is grouped within the parameter group 606 as an individual, distinct group, and corresponds to the second parameter location in the call specification 2 624.

As illustrated in FIG. 7, the process 700 returns to step 704 to access another parameter for substitution according to the parameter grouping. Once structured data has been substituted for the parameter, again a determination is made as to whether all of the substitutions for the command are complete (operation 708). In the illustrated embodiment of FIG. 8, multiple parameters (i.e. parameters Group 2, and 618) still must be substituted with structured data. Since all substitutions have not been completed, the process continues with the next substitution of the next parameter(s) of the "MoveObject" command 802. Specifically, parameters 810 and 812 (e.g. parameters 610 and 612) are identified as the parameters for the next substitution of command 802 because they are listed next in the parameter grouping 604 referenced by parameter grouping 606, and further, are grouped together. Thus, structured data for both parameters 810 and 812 will be substituted (i.e. at 810*b* and 812*b*) together, as they have been logically grouped together in the parameter grouping 604, which is referenced by parameter grouping 606 as "Group2". Finally, the parameters 610 and 612 correspond to the third and fourth parameter location in the call specification 2 624.

Referring back to FIG. 7, once structured data has been substituted for the current parameter(s), again a determination is made whether all of the substitutions for the command are complete (operation 708). In the illustrated embodiment of FIG. 8, a parameter 804 (i.e. parameter 618) must still be substituted with structured data. Specifically, structured data is substituted for a parameter 804 (e.g., 804*b*) because parameter 618 is the last parameter listed in the parameter group 606 as an individual, distinct group and corresponds to the first location within the call specification 2 624.

Referring back to FIG. 7, once structured data has been substituted for the current parameter, again a determination is made whether all of the substitutions for the command are complete (operation 708). In the illustrated embodiment of FIG. 8, after parameter 804 has been substituted, no more substitutions are required.

Referring now to process 100 of FIG. 1, once all of the parameters of a command call have been substituted, the command call is executed, or otherwise called at a code library. (operation 114). Specifically, the server 202 executes the command 203 at the external system 204. The data returned by the execution of the command is provided to the server 202 and stored for potential reuse, such as for example, as structured data for reuse within the substitution process 700 of FIG. 7. Finally, referring to FIG. 7, a determination is made as to whether any other command calls need to be made (operation 712). If so, the substitution process begins again with a different command (operation 702). Once all of the command calls have been made, the process finishes (operation 720).

As discussed herein embodiments of the present disclosure include various steps or operations which may be performed by hardware components, software components or, in alternative embodiment, hardware components may be used in combination with the software instructions. Accordingly, aspects of the present disclosure may involve a computing device or system with at least one processor, a system interface, a memory, a storage device and at least one I/O device. The system may further includes a processor bus and an input/output (I/O) bus. These and other features may or may not be included in a particular computing system, may be rearranged, and the like.

The memory typically includes one or more memory cards and control circuit, and may further include a main memory and a read only memory (ROM). According to one embodiment, the above methods may be performed by the computer system in response to the processor executing one or more sequences of one or more instructions contained in the main memory. These instructions may be read into main memory from another machine-readable medium capable of storing or transmitting information in a form (e.g., software, processing application) readable by a machine (e.g., a computer). Execution of the sequences of instructions contained in main memory may cause the processor to perform the process steps described herein.

A machine-readable media may take the form of, but is not limited to, non-volatile media and volatile media. Non-volatile media may include a mass storage device and volatile media may include dynamic storage devices. Common forms of machine-readable medium may include, but is not limited to, magnetic storage medium (e.g. floppy diskette); optical storage medium (e.g. CD-ROM), magneto-optical storage medium; read only memory (ROM); random access memory (RAM); erasable programmable memory (e.g., EPROM and EEPROM); flash memory; or other types of medium suitable for storing computer instructions.

Embodiments of the present disclosure include various steps, which are described in this specification. As discussed above, the steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various embodiments, it will be understood that these embodiments are illustrative and that the scope of the disclosure is not limited to them. Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternative, modifications, and variations together with all equivalents thereof.

What is claimed is:

1. A computer-implemented method for dynamically executing command calls of code libraries, comprising:

receiving, at a server, a command call corresponding to a command included in a code library that is stored at an external system, the command being configured to operate using one or more parameters, and the command facilitating control of a mechanical component when the command is executed;
identifying a call specification associated with the command, the call specification defining a parameter location for each parameter included in the command call;
accessing, by the server and from the external system, unstructured data generated based on a previously-executed command;
transforming, at the server, the unstructured data into structured data, the transformation of the unstructured data into structured data including:
 extracting a portion of the unstructured data, and
 assigning the portion of the unstructured data to a parameter location of the identified call specification;
accessing, at the server, at least one parameter grouping that defines a sequential order in which the one or more parameters included in the command call are to be substituted with the structured data;
recursively substituting, at the server, the one or more parameters of the command call with one or more values from the structured data according to the at least one parameter grouping and the call specification, the recursive substitution including:
 identifying, based on the at least one parameter group, a first parameter of the one or more parameters targeted for substitution,
 identifying, based on the call specification, a first parameter location of the first parameter targeted for substitution, and
 substituting the first parameter at the first parameter location with a value of the structured data; and
executing the command including the substituted one or more parameters when the recursive substitution of the one or more parameters is complete.

2. The computer-implemented method of claim 1, wherein the at least one parameter grouping includes a sequential list of parameter sets, each parameter set including at least one parameter of the one or more parameters and wherein recursively substituting the one or more parameters of the command call comprises replacing each parameter of the one or more parameters according to the sequential list of parameter sets.

3. The computer-implemented method of claim 1, further comprising reducing the structured data according to at least one filtering constraint.

4. The computer-implemented method of claim 1, wherein the external system is a tape library comprising one or more tape cartridges, and wherein one or more command calls are capable of being called at the external system to manipulate the tape cartridges, the method further comprising executing an initial command of the code library to obtain the unstructured data.

5. The computer-implemented method of claim 1, further comprising accessing the call specification corresponding to the command call, and wherein recursively substituting the one or more parameters is further based on the call specification.

6. A system for dynamically executing command calls of code libraries, comprising:
 at least one external system comprising a code library, the code library including one or more commands capable of being called at the at least one external system; and
 at least one processing device, communicatively connected to the at least one external system, to:
  receive a command call corresponding to a command included in the code library that is stored at the at least one external system, the command being configured to operate using one or more parameters, and the command facilitating control of a mechanical component when the command is executed;
  identify a call specification associated with the command, the call specification defining a parameter location for each parameter included in the command call;
  access unstructured data generated based on a previously-executed command;
  transform the unstructured data into structured data, the transforming of the unstructured data into structured data including:
   extracting a portion of the unstructured data, and
   assigning the portion of the unstructured data to a parameter location of the identified call specification;
  access at least one parameter grouping that defines a sequential order in which the one or more parameters included in the command call are to be substituted with the structured data;
  recursively substitute the one or more parameters of the command call with one or more values from the structured data according to the at least one parameter grouping and the specification, the recursive substitution including:
   identifying, based on the at least one parameter group, a first parameter of the one or more parameters targeted for substitution,
   identifying, based on the call specification, a first parameter location of the first parameter targeted for substitution, and
   substituting the first parameter at the first parameter location with a value of the structured data; and
  execute the command including the substituted one or more parameters when the recursive substitution of the one or more parameters is complete.

7. The system of claim 6, wherein the at least one parameter grouping includes a sequential list of parameter sets, each parameter set including at least one parameter of the one or more parameters, and wherein recursively substituting the one or more parameters of the command call comprises replacing each parameter of the one or more parameters according to the sequential list of parameter sets.

8. The system of claim 6, further wherein the at least one processor is further configured to reduce the structured data according to at least one filtering constraint.

9. The system of claim 6, wherein the at least one processor is further configured to:
 execute an initial command of the code library to obtain the unstructured data; and
 execute the command at the external system when the recursive substitution of the one or more parameters is complete.

10. The system of claim 6, wherein the at least one processor is further configured to access the call specification corresponding to the command, and wherein substituting the one or more parameters is further based on the call specification.

11. A non-transitory computer readable medium including instruction for making generic library calls, the instructions executable by a processing device, comprising:
 receiving a command call corresponding to a command included in a code library that is stored at an external system, the command being configured to operate using one or more parameters, and the command facilitating control of a mechanical component when the command is executed;
identifying a call specification associated with the command, the call specification defining a parameter location for each parameter included in the command call;
accessing unstructured data generated based on a previously-executed command;
transforming the unstructured data into structured data, the transformation of the unstructured data into structured data including:
extracting a portion of the unstructured data, and
assigning the portion of the unstructured data to a parameter location of the identified call specification;
accessing at least one parameter grouping that defines a sequential order in which the one or more parameters included in the command call are to be substituted with the structured data;
recursively substituting the one or more parameters of the command call with one or more values from the structured data according to the at least one parameter grouping and the call specification, the recursive substitution including:
identifying, based on the at least one parameter group, a first parameter of the one or more parameters targeted for substitution,
identifying, based on the call specification, a first parameter location of the first parameter targeted for substitution, and
substituting the first parameter at the first parameter location with a value of the structured data; and
executing the command including the substituted one or more parameters when the recursive substitution of the one or more parameters is complete.

12. The non-transitory computer readable medium of claim 11, wherein the at least one parameter grouping includes a sequential list of parameter sets, each parameter set including at least one parameter of the one or more parameters, and wherein recursively substituting the one or more parameters of the command call comprises replacing each parameter of the one or more parameters according to the sequential list of parameter sets.

13. The non-transitory computer readable medium of claim 11, further comprising accessing the call specification corresponding to the command, and wherein recursively substituting the one or more parameters is further based on the call specification.

14. The non-transitory computer readable medium of claim 11, further comprising executing an initial command of the code library to obtain the unstructured data.

15. The non-transitory computer readable medium of claim 11, wherein the external system is a tape library comprising one or more tape cartridges.

16. The non-transitory computer readable medium of claim 11, further comprising accessing the call specification corresponding to the command call, and wherein recursively substituting the one or more parameters is further based on the call specification.

17. A system for dynamically executing command calls of code libraries, comprising:
at least one external system comprising a code library, the code library including one or more commands capable of being called at the at least one external system; and
at least one processing device communicatively connected to the at least one external system, to:
receive a command call corresponding to a command included in a code library that is stored at an external system, the command being configured to operate using one or more parameters, and the command facilitating control of a mechanical component when the command is executed;
identify a call specification associated with the command, the call specification defining a parameter location for each parameter included in the command call;
access unstructured data generated based on a previously-executed command;
transform the unstructured data into structured data, the transforming of the unstructured data into structured data including:
extracting a portion of the unstructured data, and
assigning the portion of the unstructured data to a parameter location of the identified call specification;
reduce the structured data according to at least one filtering constraint;
access at least one parameter grouping that defines a sequential order in which the one or more parameters included in the command call are to be substituted with the structured data;
recursively substitute the one or more parameters of the command call with one or more values from the structured data according to the at least one parameter grouping and the call specification, the recursive substitution including
identifying, based on the at least one parameter group, a first parameter of the one or more parameters targeted for substitution,
identifying, based on the call specification, a first parameter location of the first parameter targeted for substitution, and
substituting the first parameter at the first parameter location with a value of the structured data; and
execute the command including the substituted one or more parameters when the recursive substitution of the one or more parameters is complete.

* * * * *

UNITED STATES PATENT AND TRADEMARK OFFICE
CERTIFICATE OF CORRECTION

PATENT NO. : 9,672,080 B2
APPLICATION NO. : 14/165053
DATED : June 6, 2017
INVENTOR(S) : Scrimo, Jr.

Page 1 of 1

It is certified that error appears in the above-identified patent and that said Letters Patent is hereby corrected as shown below:

In the Drawings

On sheet 7 of 8, in FIG. 7, under Reference Numeral 708, Line 1, delete "SUBSTITIONS" and insert -- SUBSTITUTIONS --, therefor.

In the Specification

Column 2, Line 65, before "are" delete "is".

Column 9, Line 38, delete ""Group2"." and insert -- "Group 2". --, therefor.

Column 9, Line 61, delete "library." and insert -- library --, therefor.

In the Claims

Column 11, Line 41, Claim 2, after "parameters" insert -- , --.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*